United States Patent
Nakashima et al.

(10) Patent No.: US 8,428,853 B2
(45) Date of Patent: Apr. 23, 2013

(54) MALFUNCTION DIAGNOSTIC APPARATUS AND MALFUNCTION DIAGNOSTIC METHOD FOR INTAKE AIR TEMPERATURE SENSORS

(75) Inventors: Toyokazu Nakashima, Toyota (JP); Kohei Kowata, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 533 days.

(21) Appl. No.: 12/810,112

(22) PCT Filed: Sep. 25, 2009

(86) PCT No.: PCT/IB2009/006941
§ 371 (c)(1),
(2), (4) Date: Jun. 22, 2010

(87) PCT Pub. No.: WO2010/035114
PCT Pub. Date: Apr. 1, 2010

(65) Prior Publication Data
US 2010/0269802 A1    Oct. 28, 2010

(30) Foreign Application Priority Data
Sep. 26, 2008  (JP) ................................. 2008-248364

(51) Int. Cl.
*F02D 41/18* (2006.01)

(52) U.S. Cl.
USPC ............................ 701/107; 701/108; 701/113

(58) Field of Classification Search ............. 123/568.21; 701/107–108, 113; 73/114.31, 114.32, 114.34, 73/114.74
See application file for complete search history.

(56) References Cited

FOREIGN PATENT DOCUMENTS
DE   10 2004 014 663   10/2005
JP       10 153125      6/1998
JP      2007 192045     8/2007

*Primary Examiner* — Hai Huynh
(74) *Attorney, Agent, or Firm* — Oblon, Spivak, McClelland, Maier & Neustadt, L.L.P.

(57) ABSTRACT

A malfunction diagnostic apparatus for intake air temperature sensors includes a coolant temperature sensor; a first determination portion that determines that a precondition for performing a malfunction diagnosis is satisfied when a process of starting an engine is started, if a detected coolant temperature is determined to be equal to an intake air temperature detected by an intake air temperature sensor provided at a portion that is likely to be cooled, and a decrease amount, by which the detected coolant temperature decreases, is equal to or larger than a preset value; a second determination portion that makes a tentative determination based on a difference between the detected intake air temperatures, if the precondition is satisfied; and a third determination portion that determines whether the tentative determination is an invalid determination or a valid determination, based on a change in the detected intake air temperatures during a given time period.

10 Claims, 4 Drawing Sheets

MALFUNCTION DIAGNOSTIC APPARATUS AND MALFUNCTION DIAGNOSTIC METHOD FOR INTAKE AIR TEMPERATURE SENSORS

BACKGROUND OF THE INVENTION

1. Field of the Invention

The invention relates to a malfunction diagnostic apparatus and a malfunction diagnostic method for intake air temperature sensors.

2. Description of the Related Art

In an internal combustion engine provided in a vehicle, an intake air temperature sensor, which detects the temperature of intake air for the engine, is provided in an intake passage. A malfunction diagnostic apparatus determines whether a malfunction occurs in the intake air temperature sensor. Japanese Patent Application Publication No. 10-153125 and Japanese Patent Application Publication No. 2007-192045 describe examples of malfunction diagnostic apparatuses for the intake air temperature sensor.

In the malfunction diagnostic apparatus described in the publication No. 10-153125, it is determined whether a malfunction occurs in a downstream-side intake air temperature sensor that detects the temperature of intake air in the intake passage at a position downstream of a turbocharger, using a coolant temperature sensor that detects the temperature of a coolant of the internal combustion engine, and an upstream-side intake air temperature sensor that detects the temperature of intake air in the intake passage at a position upstream of the turbocharger.

More specifically, it is determined whether the upstream-side intake air temperature sensor normally functions, based on whether the intake air temperature detected by the upstream-side intake air temperature sensor is lower than the coolant temperature detected by the coolant temperature sensor by a value equal to or larger than a predetermined value, using the fact that the coolant temperature is generally higher than the intake air temperature at the position upstream of the turbocharger when the internal combustion engine is operating. It is determined that the upstream-side intake air temperature sensor normally functions based on the fact that the intake air temperature detected by the upstream-side intake air temperature sensor is lower than the coolant temperature detected by the coolant temperature sensor by a value equal to or larger than the predetermined value. Then, it is determined whether a malfunction occurs in the downstream-side intake air temperature sensor based on the intake air temperatures detected by the upstream-side intake air temperature sensor and the downstream-side intake air temperature sensor, on the condition that it is determined that the upstream-side intake air temperature sensor normally functions.

More specifically, it is determined whether a malfunction occurs in the downstream-side intake air temperature sensor, based on whether the intake air temperature detected by the upstream-side intake air temperature sensor is higher than the intake air temperature detected by the downstream-side intake air temperature sensor by a value equal to or larger than a predetermined value, using the fact that the temperature of the intake air at the position upstream of the turbocharger is lower than the temperature of the intake air at the position downstream of the turbocharger due to supercharging performed by the turbocharger. Thus, it is determined that a malfunction occurs in the downstream-side intake air temperature sensor, based on the fact that the intake air temperature detected by the upstream-side intake air temperature sensor is higher than the intake air temperature detected by the downstream-side intake air temperature sensor.

In the malfunction diagnostic apparatus described in the publication No. 2007-192045, it is determined whether a malfunction occurs in an intake air temperature sensor, using a coolant temperature sensor that detects the temperature of a coolant of an internal combustion engine when the engine is in a stopped state.

More specifically, when a time, which is required for a difference between the coolant temperature and the intake air temperature (i.e., the temperature of air in an intake passage) in the internal combustion engine to fall within a predetermined range, elapses after completion of the process of stopping the engine, it is determined whether the difference between the coolant temperature detected by the coolant temperature sensor and the intake air temperature detected by the intake air temperature sensor falls within the predetermined range. Thus, it is determined that a malfunction occurs in at least one of the coolant temperature sensor and the intake air temperature sensor, based on the fact that the difference between the detected coolant temperature and the detected intake air temperature is outside the predetermined range.

In the malfunction diagnostic apparatuses described in the publication No. 10-153125 and the publication No. 2007-192045, although it is determined whether a malfunction occurs in the intake air temperature sensor, it is not necessarily possible to make an accurate determination that a malfunction occurs in the intake air temperature sensor.

In the malfunction diagnostic apparatus described in the publication No. 10-153125, it is determined whether a malfunction occurs in the downstream-side intake air temperature sensor, using the coolant temperature sensor and the upstream-side intake air temperature sensor, when the internal combustion engine is operating and the amount of heat generated by the engine frequently changes. Thus, the coolant temperature and the intake air temperature frequently change due to the influence of a frequent change in the amount of heat generated by the engine. Therefore, it is difficult to accurately determine whether a malfunction occurs in the downstream-side intake air temperature sensor, based on the values detected by the above-described sensors (i.e., the detected coolant temperature, the detected temperature of the intake air at the position upstream of the turbocharger, and the detected temperature of the intake air at the position downstream of the turbocharger). Accordingly, even if it is determined that a malfunction occurs in the downstream-side intake air temperature sensor based on the values detected by the sensors in the malfunction diagnostic apparatus, there is a high possibility that the determination is not an appropriate determination.

In the malfunction diagnostic apparatus described in the publication No. 2007-192045, it is possible to determine that a malfunction occurs in at least one of the coolant temperature sensor and the intake air temperature sensor based on the values detected by the coolant temperature sensor and the intake air temperature sensor, when the time, which is required for the difference between the coolant temperature and the intake air temperature (i.e., the temperature of the air in the intake passage), in the engine to fall within the predetermined range, elapses after completion of the process of stopping the engine. However, when it is determined that a malfunction occurs, it is not possible to determine whether a malfunction occurs in the coolant temperature, or a malfunction occurs in the intake air temperature sensor. Also, if the above-described time required after completion of the process of stopping the engine (hereinafter, referred to as "soak time") is decreased in order to increase the frequency of determining whether a malfunction occurs to a required level, the intake air temperature detected by the intake air temperature sensor may not sufficiently decrease due to, for example, solar radiation received at a portion of the vehicle, which is close to the intake air temperature sensor. In this case, even if the above-described soak time elapses, the detected intake air temperature has not sufficiently decreased, and thus, the detected intake air temperature is not appropriate for use in determination as to whether a malfunction occurs. Accordingly, in the malfunction diagnostic apparatus, it is difficult to make an accurate determination that a malfunction occurs in the intake air temperature sensor.

SUMMARY OF THE INVENTION

The invention provides a malfunction diagnostic apparatus and a malfunction diagnostic method for intake air temperature sensors, in which an accurate determination that a malfunction occurs in at least one of the intake air temperature sensors is made.

A first aspect of the invention relates to a malfunction diagnostic apparatus for intake air temperature sensors provided in an intake passage of an internal combustion engine at any two different positions in a longitudinal direction of the intake passage. Each of the intake air temperature sensors detects an intake air temperature used for a control for the internal combustion engine, and the intake air temperature sensors include a first intake air temperature sensor and a second intake air temperature sensor. The malfunction diagnostic apparatus includes a coolant temperature sensor that detects a coolant temperature that is a temperature of a coolant of the internal combustion engine; a first determination portion that determines that a precondition for performing a malfunction diagnosis is satisfied, if both of a first condition and a second condition are satisfied when a process of starting the internal combustion engine is started, wherein the first condition is a condition that the coolant temperature detected by the coolant temperature sensor is determined to be equal to the intake air temperature detected by the second intake air temperature sensor provided at a portion of the intake passage, which is more likely to be cooled than a portion of the intake passage at which the first intake air temperature sensor is provided, and the second condition is a condition that the coolant temperature decreases by a decrease amount that is equal to or larger than a preset value that is set in advance, during a time period from a time point at which a process of stopping the internal combustion engine is completed, to a time point at which the process of starting the internal combustion engine is started; a second determination portion that makes a tentative determination as to whether a malfunction occurs in at least one of the first and second intake air temperature sensors, if the first determination portion determines that the precondition is satisfied when the process of starting the internal combustion engine is started, wherein the second determination portion makes the tentative determination that the first and second intake air temperature sensors normally function, if a difference between the intake air temperatures detected by the first and second intake air temperature sensors is equal to or smaller than a reference value that is set in advance, and the second determination portion makes the tentative determination that a malfunction occurs in at least one of the first and second intake air temperature sensors, if the difference between the intake air temperatures detected by the first and second intake air temperature sensors is larger than the reference value; and a third determination portion that determines that the tentative determination is an invalid determination, if at least one of the intake air temperatures detected by the first and second intake air temperature sensors changes during a given time period that starts at the time point at which the process of starting the internal combustion engine is started, and determines that the tentative determination is a valid determination, if neither of the intake air temperatures detected by the first and second intake air temperature sensors changes during the given time period.

If the precondition for performing the malfunction diagnosis is satisfied when the process of starting the engine is started, the time point, at which the current process of starting the engine is started is not immediately after the time point at which the process of stopping the engine is completed, and the engine has been stopped for a long period so that the coolant temperature and the intake air temperature have become substantially equal to the outside air temperature. If the above-described precondition is satisfied when the process of starting the engine is started, a tentative determination that a malfunction occurs in at least one of the first and second intake air temperature sensors is made, based on the fact that the difference between the intake air temperatures detected by the first and second intake air temperature sensors is larger than the reference value that is set in advance. Because the tentative determination, that a malfunction occurs in at least one of the first and second intake air temperature sensors, is made based on the temperature difference between the intake air temperatures detected by the first and second intake air temperature sensors, there is a possibility that a malfunction occurs in the first and second intake air temperatures when the tentative determination is made. Also, the tentative determination, that a malfunction occurs in at least one of the first and second intake air temperature sensors, is made, on the assumption that the process of starting the engine has just been started, and the intake air temperature is not influenced by heat generated by the engine. This avoids the situation where it is not possible to make an accurate tentative determination that a malfunction occurs in at least one of the first and second intake air temperature sensors, due to the influence of, for example, a change in the amount of heat generated by the engine.

When the engine is in a stopped state, a portion of the vehicle, which is close to an intake air temperature sensor, may receive solar radiation, depending on the position at which the intake air temperature sensor is disposed. In this case, even if the first and second intake air temperature sensors normally function, the difference between the intake air temperatures detected by the first and second intake air temperature sensors may become larger than the reference value after fulfillment of the precondition for performing the malfunction diagnosis when the process of starting the engine is started. This may lead to an erroneous tentative determination that a malfunction occurs in at least one of the first and second intake air temperature sensors. Also, even if a malfunction occurs in at least one of the first and second intake air temperature sensors, the difference between the intake air temperatures detected by the first and second intake air temperature sensors may become equal to or smaller than the reference value. This may lead to an erroneous tentative determination that the first and second intake air temperature sensors normally function.

In order to prevent the erroneous tentative determination, it is determined whether the tentative determination is an invalid determination or a valid determination, based on whether at least one of the intake air temperatures detected by the first and second intake air temperature sensors changes during the given time period that starts at the time point at which the process of starting the engine is started. If the portion of the vehicle, which is close to an intake air temperature sensor, receives the solar radiation, the intake air temperature detected by the intake air temperature sensor changes due to the flow of air in the intake passage during the above-described time period that starts at the time point at which the process of starting the engine is started. In this case, it is considered that the tentative determination that a malfunction occurs in at least one of the first and second intake air temperature sensors, or the tentative determination that the first and second intake air temperature sensors normally function, is likely to be an erroneous determination due to the solar radiation or the like. Therefore, the tentative determination that a malfunction occurs in at least one of the first and second intake air temperature sensors, or the tentative determination that the first and second intake air temperature sensors normally function, is determined to be an invalid determination. On the other hand, if neither of the intake air temperatures detected by the first and second intake air temperature sensors changes during the above-described time period that starts at the time point at which the process of starting the engine is started, it is considered that the sensors are not influenced by the solar radiation or the like. Therefore, it is determined that the tentative determination that a malfunction occurs in at least one of the first and second intake air temperature sensors, or the tentative determination that the first and second intake air temperature sensors normally function, is not an erroneous determination due to the solar radiation or the like, that is, the tentative determination is an accurate determination. Thus, the tentative determination that a malfunction occurs in at least one of the first and second intake air temperature sensors, or the tentative determination that the first and second intake air temperature sensors normally function, is determined to be a valid determination.

Thus, it is possible to make an accurate determination that a Malfunction occurs in at least one of the first and second intake air temperature sensors, or an accurate determination that the first and second intake air temperature sensors normally function. That is, it is possible to accurately determine whether a malfunction occurs in the first and second intake air temperature sensors.

In the above-described aspect, the third determination portion may make a determination as to whether at least one of the intake air temperatures detected by the first and second intake air temperature sensors changes during a time period from the time point at which the process of starting the internal combustion engine is started and a cumulative amount of intake air for the internal combustion engine is zero, to a time point at which the cumulative amount becomes equal to or larger than a predetermined value, and the third determination portion may determine whether the tentative determination is an invalid determination or a valid determination, based on the determination as to whether at least one of the detected intake air temperatures changes during the time period; and the predetermined value may be smaller than a required cumulative amount of the intake air during a period from the time point at which the process of starting the internal combustion engine is started, to a time point at which heat generated by the internal combustion engine is transmitted to air in the intake passage, and the predetermined value may be larger than a total amount of the air that exists in the intake passage at the time point at which the process of starting the internal combustion engine is started.

With the above-described configuration, to determine whether the tentative determination that a malfunction occurs in at least one of the first and second intake air temperature sensors (or the tentative determination that the first and second intake air temperature sensors normally function) is an invalid determination or a valid determination, it is determined whether at least one of the intake air temperatures detected by the first and second intake air temperature sensors changes during the time period from the time point at which the process of starting the engine is started and the cumulative amount of intake air for the engine is "0", to the time point at which the cumulative amount becomes equal to or larger than the predetermined value. The above-described time period is shorter than the time period from the time point at which the process of starting the engine is started, to the time point at which the heat generated by the engine is transmitted to the air in the intake passage. Also, the above-described time period is longer than a time period required to deliver, to the combustion chambers, all the air that exists in the intake passage at the time point at which the process of starting the engine is started. Accordingly, if at least one of the intake air temperatures detected by the first and second intake air temperature sensors changes during the above-described time period, it is possible to appropriately determine that the change in the intake air temperature is caused by, for example, the solar radiation received at the portion of the vehicle, which is close to at least one intake air temperature sensor. Accordingly, the tentative determination that a malfunction occurs in at least one of the first and second intake air temperature sensors, or the tentative determination that the first and second intake air temperature sensors normally function, is appropriately determined to be an invalid determination. On the other hand, if neither of the intake air temperatures detected by the first and second intake air temperature sensors changes during the above-described time period, it is possible to appropriately determine that the first and second intake air temperature sensors are not influenced by the solar radiation and the like. Accordingly, the tentative determination that a malfunction occurs in at least one of the first and second intake air temperature sensors, or the tentative determination that the first and second intake air temperature sensors normally function, is appropriately determined to be a valid determination. Thus, when it is determined whether a malfunction occurs in the first and second intake air temperature sensors, it is possible to appropriately eliminate the influence of the solar radiation and the like. Accordingly, it is possible to make an accurate determination that a malfunction occurs in at least one of the first and second intake air temperature sensors, or an accurate determination that the first and second intake air temperature sensors normally function.

In the above-described aspect, the preset value used in the second condition may be equivalent to the decrease amount by which the coolant temperature decreases during a time period longer than a time period from the time point at which the process of stopping the internal combustion engine is completed, to a time point at which each of the intake air temperatures becomes lower than a value near a highest value after an increase of each of the intake air temperatures to the highest value.

After completion of the process of stopping the internal combustion engine, the coolant temperature gradually decreases, because heat is released from the coolant of the engine to an area around the coolant. In contrast, after completion of the process of stopping the engine, the temperature of the air in the intake passage increases to the highest value, because the air in the intake passage receives the heat released from the coolant and the like. Then, the temperature of the air in the intake passage gradually decreases. Accordingly, after completion of the process of stopping the engine, the intake air temperature detected by the intake air temperature sensor also increases to the highest value, and then, gradually decreases. If the intake air temperature detected by the second intake air temperature sensor is near the highest value when the process of starting the engine is started after completion of the process of stopping the engine, there is a possibility that the above-described first condition of the precondition for performing the malfunction diagnosis may be satisfied. At, this time, if the second determination portion tentatively determines whether a malfunction occurs in the first and second intake air temperature sensors, the tentative determination is made while the intake air temperatures detected by the first and second intake air temperature sensors are unstable. Thus, when the second determination portion tentatively determines whether a malfunction occurs in the first and second intake air temperature sensors, the tentative determination that a malfunction occurs in at least one of the first and second intake air temperature sensors, or the tentative determination that the first and second intake air temperature sensors normally function, may be inaccurate.

However, with the above-described configuration, the second condition needs to be satisfied to satisfy the precondition. Further, the preset value used in the second condition is equivalent to the decrease amount by which the coolant temperature decreases during a time period longer than the time period from the time point at which the process of stopping the internal combustion engine is completed, to a time point at which each of the intake air temperatures becomes lower than a value near the highest value after an increase of each of the intake air temperatures to the highest value. Therefore, in the case where the precondition is satisfied, the intake air temperature has become lower than a value near the highest value after completion of the process of stopping the engine and the second determination portion tentatively determines whether a malfunction occurs in the first and second intake air temperature sensors. This avoids the situation where the tentative determination is made while the intake air temperature is unstable. Thus, it is possible to avoid the situation where the tentative determination that a malfunction occurs in at least one of the first and second intake air temperature sensors, or the tentative determination that the first and second intake air temperature sensors normally function, is an inaccurate determination.

In the above-described aspect, the preset value used in the second condition may be equivalent to the decrease amount by which the coolant temperature decreases during a time period longer than a time period from the time point at which the process of stopping the internal combustion engine is completed, to a time point at which each of the intake air temperatures becomes lower than a value at the time point at which the process of stopping the internal combustion engine is completed, after an increase of each of the intake air temperatures to the highest value.

In the above-described aspect, an exhaust gas recirculation (EGR) control may be executed for the internal combustion engine so that part of exhaust gas passing through an exhaust system is returned to an intake system through an exhaust gas recirculation mechanism; the exhaust gas recirculation control may be executed using the intake air temperature detected by the first intake air temperature sensor provided at the portion of the intake passage, which is less likely to be cooled than the portion of the intake passage at which the second intake air temperature sensor is provided; and the reference value may be set so that if the intake air temperature detected by the first intake air temperature sensor deviates from an actual intake air temperature by the reference value, and the exhaust gas recirculation control is influenced by deviation of the detected intake air temperature, a level of deterioration of exhaust emissions discharged from the internal combustion engine is equal to an allowable limit level.

If the intake air temperatures detected by the first and second intake air temperature sensors differ from each other in the situation where the precondition is satisfied when the process of starting the internal combustion engine is started, the intake air temperature, which is detected by the first intake air temperature sensor provided in a portion of the intake passage, which is less likely to be cooled, that is, the intake air temperature used for the EGR control may deviate from an appropriate value (i.e., an actual intake air temperature). However, if the difference between the intake air temperature detected by the first intake air temperature sensor and the appropriate value is equal to or smaller than the reference value, the level of deterioration of exhaust emissions from the internal combustion engine, which is caused by the deviation, does not exceed the allowable limit level. In this case, the second determination portion tentatively determines that the first and second intake air temperature sensors normally function. That is, the second determination portion does not make the tentative determination that a malfunction occurs in at least one of the first and second intake air temperature sensors. In the above-described situation, the difference between the intake air temperatures detected by the first and second intake air temperature sensors may become larger than the reference value. In this case, the deviation of the intake air temperature detected by the first intake air temperature sensor provided in the portion of the intake passage which is less likely to be cooled, from the appropriate value may be larger than the reference value, and the level of deterioration of exhaust emissions from the internal combustion engine, which is caused by the deviation, may exceed the allowable limit level. In this case, the second determination portion makes the tentative determination that a malfunction occurs in at least one of the first and second intake air temperature sensors. Thus, if a malfunction, which makes the level of deterioration of exhaust emissions from the engine exceed the allowable limit level, occurs in the first intake air temperature sensor, it is possible to accurately make the tentative determination that a malfunction occurs in at least one of the first and second intake air temperature sensors. If such a serious malfunction does not occur in the first intake air temperature sensor, it is possible to accurately make the tentative determination that the first and second intake air temperature sensors normally function. This avoids the situation where a tentative determination that a malfunction occurs in at least one of the first and second intake air temperature sensors is made according to an extremely strict criterion.

A second aspect of the invention relates to a malfunction diagnostic method for intake air temperature sensors provided in an intake passage of an internal combustion engine at any two different positions in a longitudinal direction of the intake passage. Each of the intake air temperature sensors detects an intake air temperature used for a control for the internal combustion engine, and the intake air temperature sensors include a first intake air temperature sensor and a second intake air temperature sensor. The malfunction diagnostic method includes determining that a precondition for performing the malfunction diagnosis is satisfied, if both of a first condition and a second condition are satisfied when a process of starting the internal combustion engine is started, wherein the first condition is a condition that a coolant temperature, which is a temperature of a coolant of the internal combustion engine, and which is detected by a coolant temperature sensor, is determined to be equal to the intake air temperature detected by the second intake air temperature sensor provided at a portion of the intake passage, which is more likely to be cooled than a portion of the intake passage at which the first intake air temperature sensor is provided, and the second condition is a condition that the coolant temperature decreases by a decrease amount that is equal to or larger than a preset value that is set in advance, during a time period from a time point at which a process of stopping the internal combustion engine is completed, to a time point at which the process of starting the internal combustion engine is started; making a tentative determination as to whether a malfunction occurs in at least one of the first and second intake air temperature sensors, if it is determined that the precondition is satisfied when the process of starting the internal combustion engine is started, wherein the tentative determination that the first and second intake air temperature sensors normally function is made, if a difference between the intake air temperatures detected by the first and second intake air temperature sensors is equal to or smaller than a reference value that is set in advance, and the tentative determination that a malfunction occurs in at least one of the first and second intake air temperature sensors is made, if the difference between the intake air temperatures detected by the first and second intake air temperature sensors is larger than the reference value; and determining that the tentative determination is an invalid determination, if at least one of the intake air temperatures detected by the first and second intake air temperature sensors changes during a given time period that starts at the time point at which the process of starting the internal combustion engine is started, and determining that the tentative determination is a valid determination, if neither of the intake air temperatures detected by the first and second intake air temperature sensors changes during the given time period.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
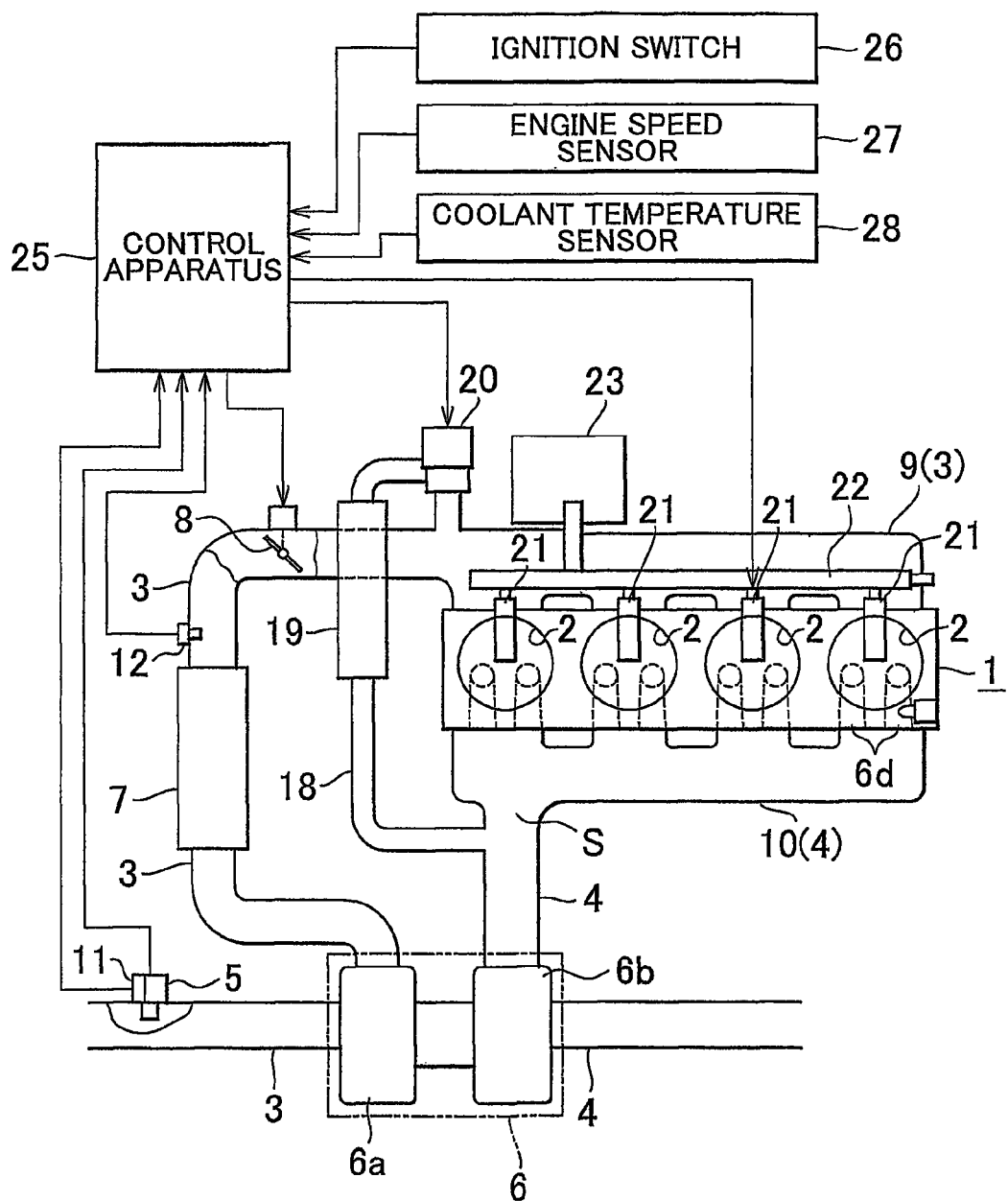
FIG. 1 is a schematic diagram showing an internal combustion engine to which a malfunction diagnostic apparatus for intake air temperature sensors according to an embodiment of the invention is applied.

Hereinafter, an embodiment of the invention will be described with reference to FIG. 1 to FIG. 4. FIG. 1 shows a configuration of an internal combustion engine 1 (hereinafter, simply referred to as "engine") to which a malfunction diagnostic apparatus for intake air temperature sensors according to the embodiment is applied. The engine 1 is a diesel engine including a common rail type fuel injection device and a turbocharger.

In the engine 1, a fuel injection valve 21 is provided for each cylinder. An intake passage 3 and an exhaust passage 4 are connected to a combustion chamber 2 of each cylinder. The fuel injection valve 21 for each cylinder receives high-pressure fuel from a high-pressure pump 23 via a common rail 22, and injects the fuel into the combustion chamber 2 so that the fuel is used for combustion in the combustion chamber 2. When the fuel, which has been injected from the fuel injection valve 21, is combusted in the combustion chamber 2, the engine 1 is operated.

In the intake passage 3 of the engine 1, an intake air temperature sensor 11, an airflow meter 5, a compressor 6a of a turbocharger 6, an intercooler 7, a post-compressor intake air temperature sensor 12, and an intake throttle valve 8 are disposed in a direction from an upstream portion of the intake passage 3 to a downstream portion of the intake passage 3. The intake passage 3 is divided into sub-intake passages, which correspond to the respective cylinders, at an intake manifold 9 provided downstream of the intake throttle valve 8. The airflow meter 5 detects the amount of air (intake air) that passes through the intake passage 3. The intake air temperature sensor 11 detects the temperature of air (intake air) in the intake passage 3 at a position upstream of the turbocharger 6 (the compressor 6a). The post-compressor intake air temperature sensor 12 detects the temperature of air (intake air) in the intake passage 3 at a position downstream of the turbocharger 6.

The exhaust passage 4 of the engine 1 is divided into sub-exhaust passages, which correspond to the respective cylinders, at an exhaust manifold 10 connected to the combustion chambers 2 of the cylinders. The sub-exhaust passages are combined into one exhaust passage 4. The exhaust passage 4 is connected to an exhaust turbine 6b of the turbocharger 6, at a position downstream of the exhaust manifold 10.

The engine 1 is provided with an exhaust gas recirculation (hereinafter, referred to as "EGR") mechanism that introduces part of exhaust gas into air in the intake passage 3 to recirculate the part of the exhaust gas. The EGR mechanism includes an EGR passage 18 that connects the exhaust passage 4 to the intake passage 3. The most upstream portion of the EGR passage 18 is connected to a portion of the exhaust passage 4, which is located upstream of the exhaust turbine 6b in a direction in which the exhaust gas flows. In the EGR passage 18, an EGR cooler 19 and an EGR valve 20 are disposed in the stated order in a direction from an upstream portion of the EGR passage 18 to a downstream portion of the EGR passage 18. The EGR cooler 19 cools the recirculated exhaust gas. The EGR valve 20 adjusts the flow rate of the exhaust gas. The most downstream portion of the EGR passage 18 is connected to a portion of the intake passage 3, which is located downstream of the intake throttle valve 8.

A control apparatus 25 executes controls for the engine 1. The control apparatus 25 includes a CPU, a ROM, a RAM, and input/output ports. The CPU performs calculations relating to the engine controls. Programs and data, which are necessary for the controls, are stored in the ROM. Results of the calculations performed by the CPU are temporarily stored in the RAM. Signals are input from the outside to the control apparatus 25 through the input port, and signals are output from the control apparatus 25 to the outside through the output port.

The input port of the control apparatus 25 is connected to an ignition switch 26, an engine speed sensor 27, and a coolant temperature sensor 28, in addition to the above-described sensors. The ignition switch 26 is operated to start or stop the engine 1. The engine speed sensor 27 detects an engine speed. The coolant temperature sensor 28 detects the temperature of a coolant of the engine 1. The output port of the control apparatus 25 is connected to drive circuits for, for example, the intake throttle valve 8, the EGR valve 20, and the fuel injection valve 21.

The control apparatus 25 outputs command signals to the drive circuits for the devices, which are connected to the output port, according to an engine operating state determined based on detection signals input to the control apparatus 25 from the sensors. Thus, the control apparatus 25 executes controls. For example, the control apparatus 25 executes an EGR control by adjusting the opening amount of the intake throttle valve 8, and adjusting the opening amount of the EGR valve 20, and executes a fuel injection control for the fuel injection valve 21.

In the EGR control among the controls for the engine 1, an EGR ratio (i.e., a ratio between the amount of EGR gas and the intake air amount) is adjusted to improve exhaust emissions discharged from the engine 1. More specifically, a target EGR ratio is calculated based on the engine operating state, and a target opening amount of the intake throttle valve 8 (a target throttle valve opening amount) and a target opening amount of the EGR valve 20 (a target EGR valve opening amount) are calculated based on the target EGR ratio. Then, the opening amount of the intake throttle valve 8 and the opening amount of the EGR valve 20 are adjusted according to the respective target opening amounts. Thus, the EGR ratio of the engine 1 is adjusted to the optimum value for improving the exhaust emissions discharged from the engine 1.

When the exhaust gas is recirculated, the exhaust emissions discharged from the engine 1 are influenced by a change in the density of intake air (i.e., the amount of oxygen) for the engine 1, which is caused by a change in the intake air temperature. Therefore, when the target EGR ratio is calculated, the temperature of the intake air for the engine 1 may be taken into account, to adjust the EGR ratio to the optimum value for improving the exhaust emissions discharged from the engine 1 without being influenced by a change in the intake air temperature. Accordingly, when the target EGR ratio is calculated, for example, the intake air temperature detected by the intake air temperature sensor 11 is taken into account. The intake air temperature sensor 11 is provided at a portion of the intake passage 3, which is less likely to be cooled than a portion of the intake passage 3, at which the post-compressor intake air temperature sensor 12 is provided. Thus, the EGR control is executed using the temperature of the intake air for the engine 1. As a result, the EGR ratio is adjusted to the optimum value for improving the exhaust emissions discharged from the engine 1, without being influenced by a change in the intake air temperature. When the EGR control is executed, the intake air temperature detected by the post-compressor intake air temperature sensor 12 may be taken into account.

The intake air temperature detected by the intake air temperature sensor 11 or the post-compressor intake air temperature sensor 12 may deviate from an actual value, that is, an appropriate value, due to a malfunction of the intake air temperature sensor 11 or 12. Therefore, a malfunction diagnosis needs to be performed to determine whether a malfunction occurs in the air temperature sensors 11 and 12, in order to avoid the situation where the intake air temperature, which deviates from an appropriate value, is used for the EGR control or the like. However, it may not be possible to accurately determine whether a malfunction occurs in the intake air temperature sensors 11 and 12, depending on the method of performing the malfunction diagnosis for the intake air temperature sensors 11 and 12.

Figure 2:
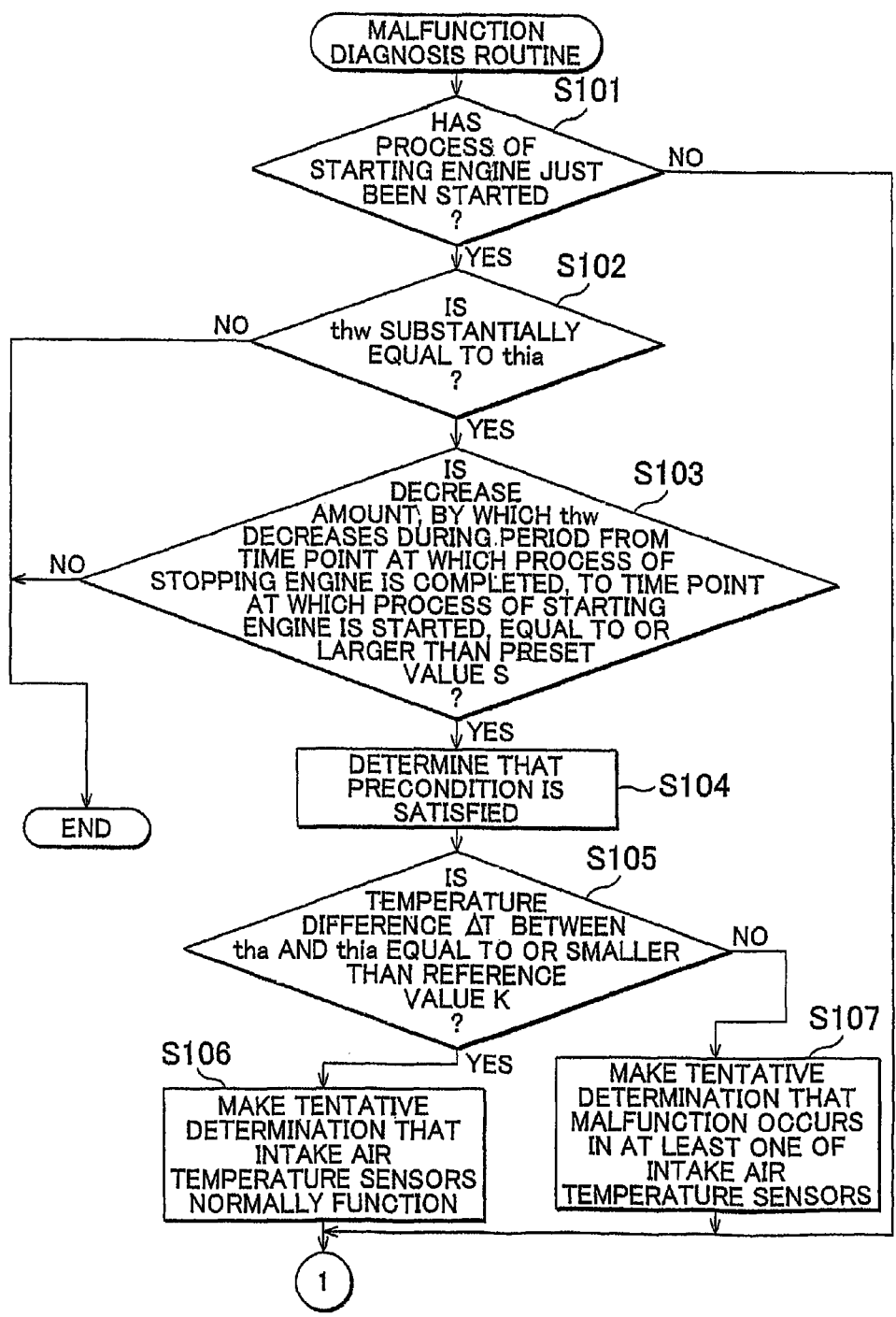
FIG. 2 is a flowchart showing steps of a malfunction diagnosis for intake air temperature sensors.
Figure 3:
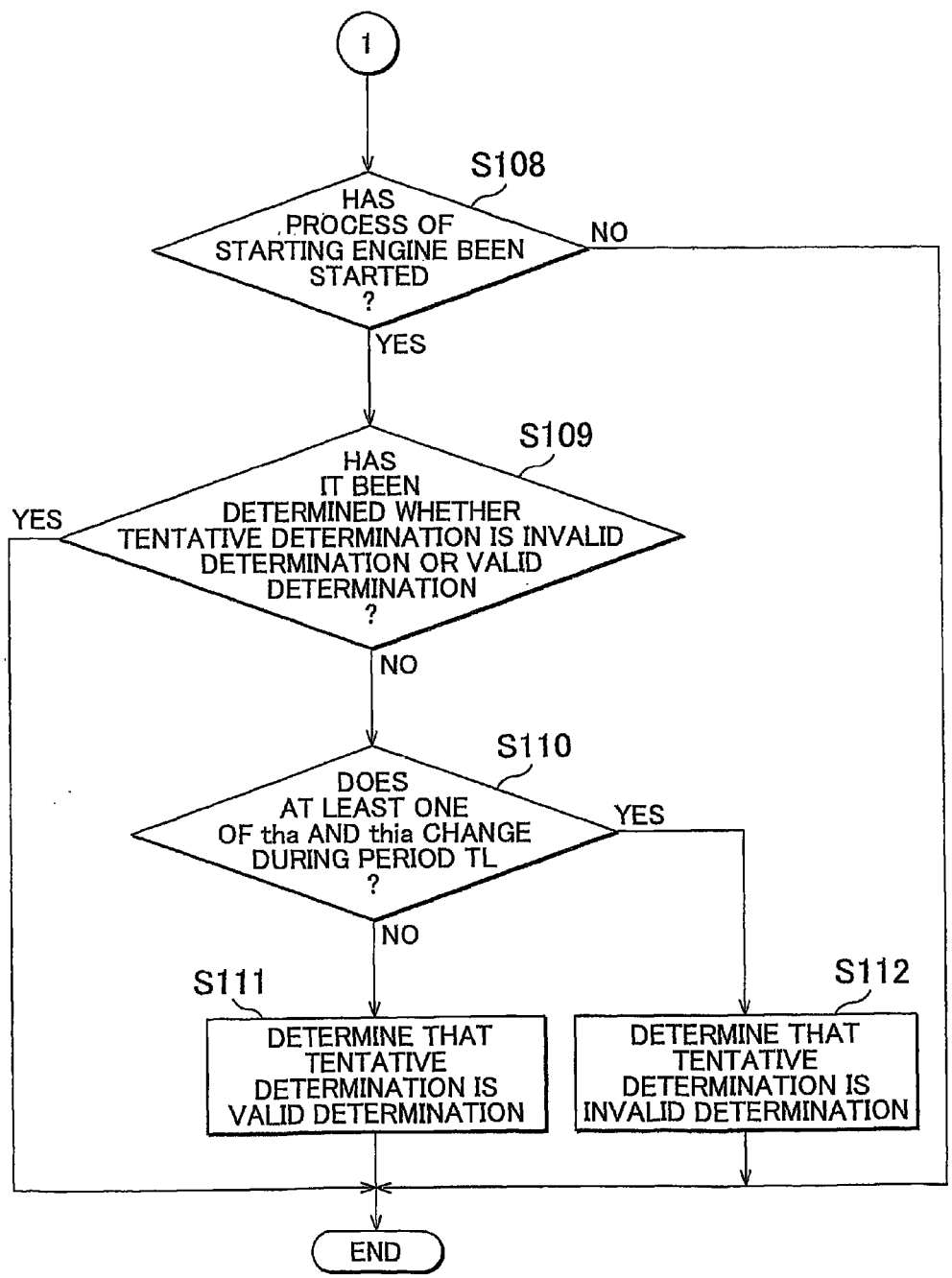
FIG. 3 is a flowchart showing steps of a malfunction diagnosis for intake air temperature sensors.

In the embodiment, in order to avoid the situation where it cannot be accurately determined whether a malfunction occurs in the intake air temperature sensors 11 and 12, the malfunctions diagnosis is performed according to steps of a malfunction diagnosis routine shown in FIG. 2 and FIG. 3. In the malfunction diagnosis, an intake air temperature tha detected by the intake air temperature sensor 11, a post-compressor intake air temperature thia detected by the post-compressor intake air temperature sensor 12, and a coolant temperature thw detected by the coolant temperature sensor 28 are used. For example, the malfunction diagnosis routine is executed at predetermined time intervals, as an interrupt, by the control apparatus 25.

In the routine, the following steps (a) to (c) are sequentially executed.

(a) When a process of starting the engine 1 is started according to the operation of the ignition switch 26 (YES in step S101 in FIG. 2), it is determined whether a precondition for performing the malfunction diagnosis for the intake air temperature sensors 11 and 12 is satisfied (S102 to S104). It is determined that the precondition is satisfied (S104) when both of a first condition and a second condition are satisfied. The first condition is the condition that the coolant temperature thw detected by the coolant temperature sensor 28 is determined to be equal to the post-compressor intake air temperature thia detected by the post-compressor intake air temperature sensor 12 (YES in step S102). The second condition is the condition that a decrease amount H, by which the coolant temperature thw decreases during a period from a time point at which a process of stopping the engine 1 is completed, to a time point at which the process of starting the engine 1 is started, is equal to or larger than a preset value S that is set in advance (YES in step S103).

(b) If it is determined that the precondition for performing the malfunction diagnosis is satisfied in the step (a), it is tentatively determined whether a malfunction occurs in the intake air temperature sensors 11 and 12 (S105 to S107). More specifically, if a temperature difference ΔT between the intake air temperature tha detected by the intake air temperature sensor 11 and the post-compressor intake air temperature thia detected by the post-compressor intake air temperature sensor 12 is equal to or smaller than a reference value K that is set in advance (YES in step S105), it is tentatively determined that the intake air temperature sensors 11 and 12 normally function (S106). If the temperature difference ΔT is larger than the reference value K (NO in step S105), it is tentatively determined that a malfunction occurs in at least one of the intake air temperature sensors 11 and 12 (S107).

(c) After making a tentative determination as to whether a malfunction occurs in the intake air temperature sensors 11 and 12 in the step (b), it is determined whether the tentative determination is an invalid determination or a valid determination based on a change in the intake air temperature tha and the post-compressor intake air temperature thia during a given time period that starts at the time point at which the process of starting the engine 1 is started (S108 to S112 in FIG. 3). More specifically, when the process of starting the engine 1 has been started (YES in step S108), and it has not been determined whether the tentative determination is an invalid determination or a valid determination (NO in step S109), it is determined whether at least one of the intake air temperatures tha and thia changes during a time period TL from the time point at which the process of starting the engine 1 is started and the cumulative amount of intake air for the engine 1 is "0", to a time point at which the cumulative amount is equal to or larger than a predetermined value "a" (S110). If an affirmative determination is made in step S110, the above-described tentative determination is determined to be an invalid determination (S112). If a negative determination is made in step S110, the above-described tentative determination is determined to be a valid determination (S111).

Figure 4:
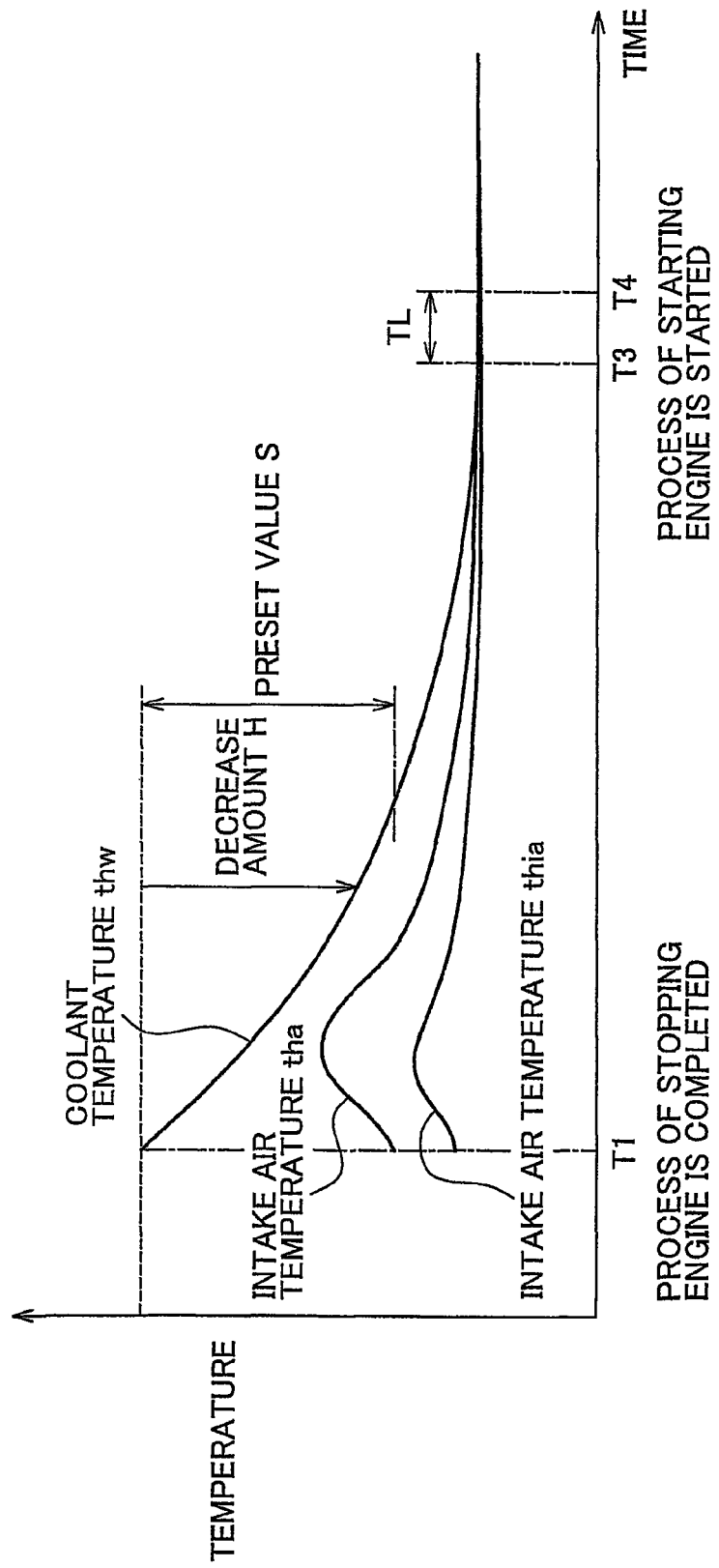
FIG. 4 is a graph showing changes in a coolant temperature and in intake air temperatures during a time period from a time point at which a process of stopping the internal combustion engine is completed, to a time point at which a process of starting the internal combustion engine is started.

Next, the reason, why the above-described malfunction diagnosis is effective for accurately determining whether a malfunction occurs in the intake air temperatures 11 and 12, will be described in detail with reference to a graph in FIG. 4. The graph in FIG. 4 shows changes in the coolant temperature thw, the intake air temperature tha, and the post-compressor intake air temperature thia during a time period from the time point at which the process of stopping the engine 1 is completed, to the time point at which the process of starting the engine 1 is started.

After completion of the process of stopping the engine 1 (i.e., after a timing T1), the coolant temperature thw gradually decreases, because heat is released from the coolant of the engine 1 to an area around the coolant. In contrast, after completion of the process of stopping the engine 1 (i.e., after the timing T1), the temperature of the air in the intake passage 3, which is indicated by, for example, the intake air temperatures tha and thia, increases to the highest value, because the air in the intake passage 3 receives the heat released from the coolant and the like. Then, the temperature of the air in the intake passage 3 gradually decreases. In the example shown in FIG. 4, the intake air temperatures tha and thia decrease over time, while the intake air temperature tha remains higher than the intake air temperature thia. This is because the intake air temperature sensor 11 and the post-compressor intake air temperature sensor 12 are disposed so that the intake air temperature sensor 11 is more likely to be influenced by the heat released from the coolant and the like than the post-compressor intake air temperature sensor 12, and the post-compressor intake air temperature sensor 12 is more likely to be cooled by the outside air and the like than the intake air temperature sensor 11. In other words, the intake air temperature sensor 11 is provided at the portion of the intake passage 3, which is not likely to be cooled, and the post-compressor intake air temperature sensor 12 is provided at the portion of the intake passage 3, which is likely to be cooled.

If the precondition for performing the malfunction diagnosis for the intake air temperature sensors 11 and 12 is satisfied in the step (a) when the process of starting the engine 1 is started (at a timing T3), both of the first condition and the second condition in the step (a) are satisfied. This means that the time point, at which the current process of starting the engine 1 is started, is not immediately after the time point at which the process of stopping the engine 1 is completed, and the engine 1 has been stopped for a long period so that the coolant temperature thw and the post-compressor intake air temperature thia have become substantially equal to the outside air temperature. If the above-described precondition is satisfied when the process of starting the engine 1 is started (at the timing T3), a tentative determination that a malfunction occurs in at least one of the intake air temperature sensors 11 and 12 is made, based on the fact that the temperature difference ΔT between the intake air temperature tha and the post-compressor intake air temperature thia is larger than the reference value K in the step (b). Because the tentative determination, that a malfunction occurs in at least one of the intake air temperature sensors 11 and 12, is made based on the temperature difference ΔT between the intake air temperature tha and the post-compressor intake air temperature thia, there is a possibility that a malfunction occurs in at least one of the intake air temperatures 11 and 12 when the tentative determination is made. Also, the tentative determination, that a malfunction occurs in at least one of the intake air temperature sensors 11 and 12 is made, on the assumption that the process of starting the engine 1 has just been started, and the intake air temperature is not influenced by heat generated by the engine 1. This avoids the situation where it is not possible to make an accurate tentative determination that a malfunction occurs in at least one of the intake air temperature sensors 11 and 12, due to the influence of a change in the amount of heat generated by the engine 1.

When the engine 1 is in a stopped state, a portion of the vehicle, which is close to the intake air temperature sensor 11, and/or a portion of the vehicle, which is close to the post-compressor intake air temperature sensor 12 may receive solar radiation, depending on the positions at which the sensors 11 and 12 are disposed. In this case, even if the intake air temperature sensors 11 and 12 normally function, the temperature difference ΔT between the intake air temperature tha and the post-compressor intake air temperature thia may become larger than the reference value K after fulfillment of the precondition for performing the malfunction diagnosis when the process of Starting the engine 1 is started. This may lead to an erroneous tentative determination that a malfunction occurs in at least one of the intake air temperature sensors 11 and 12. On the other hand, even if a malfunction occurs in at least one of the intake air temperature sensors, the temperature difference ΔT between the intake air temperature tha and the post-compressor intake air temperature thia may become equal to or smaller than the reference value K. This may lead to an erroneous tentative determination that the intake air temperature sensors 11 and 12 normally function.

In order to prevent the erroneous tentative determination, after the tentative determination that the intake air temperature sensors 11 and 12 normally function, or that a malfunction occurs in at least one of the intake air temperature sensors 11 and 12 in the step (b), it is determined whether the tentative determination is an invalid determination or a valid determination in the step (c). More specifically, it is determined whether the tentative determination is an invalid determination or a valid determination, based on Whether at least one of the intake air temperature tha and the post-compressor intake air temperature thia changes during the time period TL from the time point at which the process of starting the engine 1 is started and the cumulative amount of intake air for the engine 1 is "0", to the time point at which the cumulative amount is equal to or larger than the predetermined value "a".

If the portion of the vehicle, which is close to the intake air temperature sensor 11, and/or the portion of the vehicle, which is close to the post-compressor intake air temperature sensor 12, receive(s) the solar radiation, the intake air temperature tha and/or the post-compressor intake air temperature thia change(s) due to the flow of air in the intake passage 3 during the time period TL that starts at the time point at which the process of starting the engine 1 is started (i.e., the time period from the timing T3 to the timing T4). In this case, it is considered that the tentative determination that a malfunction occurs in at least one of the intake air temperature sensors 11 and 12, or the tentative determination that the intake air temperature sensors 11 and 12 normally function is likely to be an erroneous determination due to the solar radiation or the like. Therefore, the tentative determination that a malfunction occurs in at least one of the intake air temperature sensors 11 and 12, or the tentative determination that the intake air temperature sensors 11 and 12 normally function, is determined to be an invalid determination. On the other hand, if neither the intake air temperature tha nor the post-compressor intake air temperature thia changes during the time period TL that starts at the time point at which the process of starting the engine 1 is started, it is considered that the sensors 11 and 12 are not influenced by the solar radiation or the like. Therefore, it is determined that the tentative determination that a malfunction occurs in at least one of the intake air temperature sensors 11 and 12, or the tentative determination that the intake air temperature sensors 11 and 12 normally function, is not an erroneous determination due to the solar radiation or the like, that is, the tentative determination is an accurate determination. Thus, the tentative determination that a malfunction occurs in at least one of the intake air temperature sensors 11 and 12, or the tentative determination that the intake air temperature sensors 11 and 12 normally function, is determined to be a valid determination.

Thus, it is possible to make an accurate determination that a malfunction occurs in at least one of the intake air temperature sensors, or an accurate determination that the intake air temperature sensors 11 and 12 normally function. That is, it is possible to accurately determine whether a malfunction occurs in the intake air temperature sensors 11 and 12.

Next, the preset value S used in the second condition in the step (a) will be described in detail. After completion of the process of stopping the engine 1, the coolant temperature thw gradually decreases, because heat is released from the coolant of the engine 1 to the area around the coolant. In contrast, after completion of the process of stopping the engine 1, the temperature of the air in the intake passage 3 increases to the highest value because the air in the intake passage 3 receives the heat released from the coolant and the like. Then, the temperature of the air in the intake passage 3 gradually decreases. Therefore, after completion of the process of stopping the engine 1, the coolant temperature thw, the intake air temperature tha, and the post-compressor intake air temperature thia change over time, for example, as shown in FIG. 4.

When the post-compressor intake air temperature thia detected by the post-compressor intake air temperature sensor 12 increases to a value near the highest value after completion of the process of stopping the engine 1, the post-compressor intake air temperature thia may become substantially equal to the coolant temperature thw, and the engine 1 may be started in this situation. In this case, there is a possibility that the above-described first condition of the precondition for performing the malfunction diagnosis may be satisfied. At this time, if it is tentatively determined whether a malfunction occurs in the intake air temperature sensors 11 and 12 based on the intake air temperatures tha and thia, the tentative determination is made while the intake air temperatures tha and thia are unstable. Thus, the tentative determination that a malfunction occurs in at least one of the intake air temperature sensors 11 and 12, or the tentative determination that the intake air temperature sensors 11 and 12 normally function, may be inaccurate.

In order to prevent the inaccurate tentative determination, the preset value S, used in the second condition of the precondition for performing the malfunction diagnosis, is equivalent to the decrease amount by which the coolant temperature thw decreases during a time period longer than a time period from the time point at which the process of stopping the engine 1 is completed, to a time point at which each of the intake air temperatures tha and thia becomes lower than a value near the highest value after an increase of each of the intake air temperatures tha and thia to the highest value. More specifically, the preset value S is equivalent to the decrease amount by which the coolant temperature thw decreases during a time period longer than a time period from the time point at which the process of stopping the engine 1 is completed, to a time point at which each of the intake air temperatures tha and thia becomes lower than a value near the highest value, and lower than a value at the time point at which the process of stopping the engine 1 is completed (i.e., at the timing T1), after an increase of each of the intake air temperatures tha and thia to the highest value.

Thus, in the case where the precondition is satisfied when the process of starting the engine 1 is started (at the timing T3), the post-compressor intake air temperature thia has become lower than a value near the highest value after completion of the process of stopping the engine 1 and it is tentatively determined whether a malfunction occurs in the intake air temperature sensors 11 and 12 based on the intake air temperatures tha and thia. This avoids the situation where the tentative determination is made while the intake air temperatures tha and thia are unstable. Thus, it is possible to avoid the situation where it is tentatively determined whether a malfunction occurs in the intake air temperature sensors 11 and 12 based on the intake air temperatures tha and thia while the intake air temperatures tha and thia are unstable, and accordingly, the tentative determination that a malfunction occurs in at least one of the intake air temperature sensors 11 and 12, or the tentative determination that the intake air temperature sensors 11 and 12 normally function, is an inaccurate determination.

Next, the reference value K used in the step (b) will be described in detail. The reference value K is set so that if the intake air temperature tha detected by the intake air temperature sensor 11 deviates from an appropriate value (i.e., an actual intake air temperature) by the reference value K, and the EGR control is influenced by the deviation of the intake air temperature tha when the post-compressor intake air temperature sensor 12 normally functions, the level of deterioration of exhaust emissions discharged from the engine 1 is equal to an allowable limit level.

Accordingly, in the case where the precondition is satisfied when the process of starting the engine 1 is started, and the intake air temperature tha detected by the intake air temperature sensor 11 deviates from the post-compressor intake air temperature thia detected by the post-compressor intake air temperature sensor 12 by a value equal to or smaller than the reference value K, the level of deterioration of exhaust emissions from the engine 1, which is caused by the deviation, does not exceed the allowable limit level. In this case, it is tentatively determined that the intake air temperature sensors 11 and 12 normally function, based on the fact that the temperature difference ΔT is equal to or smaller than the reference value K. That is, it is not tentatively determined that a malfunction occurs in at least one of the intake air temperature sensors 11 and 12.

If the intake air temperature tha detected by the intake air temperature sensor 11 deviates from the post-compressor intake air temperature thia detected by the post-compressor intake air temperature sensor 12 by a value larger than the reference value K in the above-described situation, the level of deterioration of exhaust emissions from the engine 1, which is caused by the deviation, may exceed the allowable limit level. In this case, it is tentatively determined that a malfunction occurs in at least one of the intake air temperature sensors 11 and 12, based on the fact that the temperature difference ΔT between the intake air temperature tha and the post-compressor intake air temperature thia is larger than the reference value K.

Thus, if a malfunction, which makes the level of deterioration of exhaust emissions from the engine 1 exceed the allowable limit level, occurs in the intake air temperature sensor 11, it is possible to accurately make the tentative determination that a malfunction occurs in at least one of the intake air temperature sensors 11 and 12. If such a serious malfunction does not occur in the intake air temperature sensor 11, and no malfunction occurs in the intake air temperature sensor 12, it is possible to accurately make the tentative determination that the intake air temperature sensors 11 and 12 normally function. This avoids the situation where a tentative determination that a malfunction occurs in at least one of the intake air temperature sensors 11 and 12 is made according to an extremely strict criterion.

Next, the predetermined value "a" used in the step (c) will be described in detail. The predetermined value "a" is used to set the time period TL in the step (c). That is, the time period TL is the time period from the time point at which the process of starting the engine 1 is started and the cumulative amount of intake air for the engine 1 is "0", to the time point at which the cumulative amount becomes equal to or larger than the predetermined value "a". The predetermined value "a" is smaller than a required cumulative amount of the intake air during a period from the time point at which the process of starting the engine 1 is started, to a time point at which heat generated by the engine 1 is transmitted to the air in the intake passage 3. Also, the predetermined value "a" is larger than the total amount of air that exists in the intake passage 3 at the time point at which the process of starting the engine 1 is started.

Then, to determine whether the tentative determination that a malfunction occurs in at least one of the intake air temperature sensors 11 and 12 or the tentative determination that the intake air temperature sensors 11 and 12 normally function is an invalid determination or a valid determination, it is determined whether at least one of the intake air temperature tha detected by the intake air temperature sensor 11 and the intake air temperature thia detected by the post-compressor intake air temperature sensor 12 changes during the time period TL. The time period TL is shorter than the time period from the time point at which the process of starting the engine 1 is started, to the time point at which the heat generated by the engine 1 is transmitted to the air in the intake passage 3. Also, the time period TL is longer than a time period required to deliver, to the combustion chambers 2, all the air that exists in the intake passage 3 at the time point at which the process of starting the engine 1 is started.

Accordingly, if at least one of the intake air temperature tha and the post-compressor intake air temperature thia changes during the time period TL, it is possible to appropriately determine that the change in the intake air temperature(s) is caused by, for example, the solar radiation received at the portion of the vehicle, which is close to the intake air temperature sensor 11 and/or the portion of the vehicle, which is close to the post-compressor intake air temperature sensor 12. Accordingly, the tentative determination that a malfunction occurs in at least one of the intake air temperature sensors 11 and 12, or the tentative determination that the intake air temperature sensors 11 and 12 normally function, is appropriately determined to be an invalid determination. On the other hand, if neither the intake air temperature tha nor the post-compressor intake air temperature thia changes during the time period TL, it is possible to appropriately determine that the intake air temperature sensor 11 and the post-compressor intake air temperature sensor 12 are not influenced by the solar radiation and the like. Accordingly, the tentative determination that a malfunction occurs in at least one of the intake air temperature sensors 11 and 12, or the tentative determination that the intake air temperature sensors 11 and 12 normally function, is appropriately determined to be a valid determination.

Thus, when it is determined whether a malfunction occurs in the intake air temperature sensors 11 and 12, it is possible to appropriately eliminate the influence of the solar radiation and the like. Accordingly, it is possible to make an accurate determination that a malfunction occurs in at least one of the intake air temperature sensors 11 and 12, or an accurate determination that the intake air temperature sensors 11 and 12 normally function.

According to the embodiment that has been described in detail, it is possible to obtain advantageous effects. (1) If the precondition for performing the malfunction diagnosis for the intake air temperature sensors 11 and 12 is satisfied when the process of starting the engine 1 is started, a tentative determination that a malfunction occurs in at least one of the intake air temperature sensors 11 and 12 is made, based on the fact that the temperature difference ΔT between the intake air temperature tha and the intake air temperature thia is larger than the reference value K. Because the tentative determination, that a malfunction occurs in at least one of the intake air temperature sensors 11 and 12, is made based on the temperature difference ΔT between the intake air temperature tha and the post-compressor intake air temperature thia, there is a possibility that a malfunction occurs in at least one of the intake air temperatures 11 and 12 when the tentative determination is made. Also, the tentative determination that a malfunction occurs in at least one of the intake air temperature sensors 11 and 12, is made on the assumption that the process of starting the engine 1 has just been started, and the intake air temperature is not influenced by heat generated in the engine 1. This avoids the situation where it is not possible to make an accurate tentative determination that a malfunction occurs in the intake air temperature sensor 11, due to occurrence of a malfunction in the post-compressor intake air temperature sensor 12, or the influence of a change in the amount of heat generated by the engine 1.

Further, after it is tentatively determined whether a malfunction occurs in the intake air temperature sensors 11 and 12 in the step (b), it is determined whether the tentative determination is an invalid determination or a valid determination in the step (c). More specifically, if at least one of the intake air temperature tha and the post-compressor intake air temperature thia changes during the time period TL from the time point at which the process of starting the engine 1 is started and the cumulative amount of intake air for the engine 1 is "0", to the time point at which the cumulative amount becomes equal to or larger than the predetermined value "a", the tentative determination that a malfunction occurs in at least one of the intake air temperature sensors 11 and 12, or the tentative determination that the intake air temperature sensors 11 and 12 normally function, is determined to be an invalid determination. On the other hand, if neither the intake air temperature tha nor the post-compressor intake air temperature thia changes during the time period TL, the tentative determination that a malfunction occurs in at least one of the intake air temperature sensors 11 and 12, or the tentative determination that the intake air temperature sensors 11 and 12 normally function, is determined to be a valid determination.

Thus, it is possible to make an accurate determination that a malfunction occurs in at least one of the intake air temperature sensors, or an accurate determination that the intake air temperature sensors 11 and 12 normally function. That is, it is possible to accurately determine whether a malfunction occurs in the intake air temperature sensors 11 and 12.

(2) The predetermined value "a" used to set the time period TL is smaller than a required cumulative amount of the intake air during a time period from the time point at which the process of starting the engine 1 is started, to the time point at which the heat generated by the engine 1 is transmitted to the air in the intake passage 3. Also, the predetermined value "a" is larger than the total amount of air that exists in the intake passage 3 at the time point at which the process of starting the engine 1 is started. Accordingly, if at least one of the intake air temperature tha and the post-compressor intake air temperature thia changes during the time period TL, it is possible to appropriately determine that the change in the intake air temperature(s) is caused by, for example, the solar radiation received at the portion of the vehicle, which is close to the intake air temperature sensor 11 and/or the portion of the vehicle, which is close to the post-compressor intake air temperature sensor 12. Accordingly, the tentative determination that a malfunction occurs in at least one of the intake air temperature sensors 11 and 12, or the tentative determination that the intake air temperature sensors 11 and 12 normally function, is appropriately determined to be an invalid determination. On the other hand, if neither the intake air temperature tha nor the post-compressor intake air temperature thia changes during the time period TL, it is possible to appropriately determine that the intake air temperature sensor 11 and the post-compressor intake air temperature sensor 12 are not influenced by the solar radiation and the like. Accordingly, the tentative determination that a malfunction occurs in at least one of the intake air temperature sensors 11 and 12, or the tentative determination that the intake air temperature sensors 11 and 12 normally function, is appropriately determined to be a valid determination. Thus, when it is determined whether a malfunction occurs in the intake air temperature sensors 11 and 12, it is possible to appropriately eliminate the influence of the solar radiation and the like. Accordingly, it is possible to make an accurate determination that a malfunction occurs in at least one of the intake air temperature sensors 11 and 12, or an accurate determination that the intake air temperature sensors 11 and 12 normally function.

(3) The preset value S, which is used in the second condition of the precondition for performing the malfunction diagnosis for the intake air temperature sensors 11 and 12, is equivalent to the decrease amount by which the coolant temperature thw decreases during a time period longer than the time period from the time point at which the process of stopping the engine 1 is completed, to the time point at which each of the intake air temperatures tha and thia becomes lower than a value near the highest value after an increase of each of the intake air temperatures tha and thia to the highest value. Each of the intake air temperatures tha and thia increases to the highest value after completion of the process of stopping the engine 1. Therefore, in the case where the precondition is satisfied when the process of starting the engine 1 is started, the post-compressor intake air temperature thia has become lower than a value near the highest value after completion of the process of stopping the engine 1 and it is tentatively determined whether a malfunction occurs in the intake air temperature sensors 11 and 12 based on the intake air temperatures tha and thia. This avoids the situation where the tentative determination is made while the intake air temperatures tha and thia are unstable. Thus, it is possible to avoid the situation where the tentative determination is made based on the intake air temperatures tha and thia while the intake air temperatures tha and thia are unstable, and accordingly, the tentative determination that a malfunction occurs in at least one of the intake air temperature sensors 11 and 12, or the tentative determination that the intake air temperature sensors 11 and 12 normally function, is an inaccurate determination.

(4) The reference value K, which is used in the step (b) to determine whether a malfunction occurs in the intake air temperature sensors 11 and 12, is set so that if the intake air temperature tha detected by the intake air temperature sensor 11 deviates from an appropriate value (i.e., an actual intake air temperature) by the reference value K, and the EGR control is influenced by the deviation of the intake air temperature tha, the level of deterioration, of exhaust emissions discharged from the engine 1 is equal to the allowable limit level. Therefore, if a malfunction, which makes the level of deterioration of exhaust emissions from the engine 1 exceed the allowable limit level, occurs in the intake air temperature sensor 11, it is possible to appropriately make a tentative determination that a malfunction occurs in at least one of the intake air temperature sensors 11 and 12, based on the fact that the temperature difference $\Delta T$ is larger than the reference value K in the situation where the precondition is satisfied when the process of starting the engine 1 is started. On the other hand, if a malfunction, which makes the level of deterioration of exhaust emissions from the engine 1 exceed the allowable limit level, does not occur in the intake air temperature sensor 11, and no malfunction occurs in the intake air temperature sensor 12, the temperature difference $\Delta T$ is equal to or smaller than the reference value K, in the situation where the precondition is satisfied when the process of starting the engine 1 is started. Accordingly, it is possible to make a tentative determination that the intake air temperature sensors 11 and 12 normally function. That is, if a malfunction, which makes the level of deterioration of exhaust emissions from the engine 1 exceed the allowable limit level, does not occur in the intake air temperature sensor 11, and no malfunction occurs in the intake air temperature sensor 12, it is tentatively determined that the intake air temperature sensors 11 and 12 normally function. This avoids the situation where a tentative determination that a malfunction occurs in at least one of the intake air temperature sensors 11 and 12 is made according to an extremely strict criterion.

The above-described embodiment may be changed in the following manners. In the above-described embodiment, because the intake air temperature tha is used for the EGR control, the reference value K is set taking into account the exhaust emissions discharged from the engine 1. However, if the intake air temperature tha is used for a certain control other than the EGR control, the reference value K may be set taking into account the certain control.

In the above-described embodiment, the time period TL is the time period from the time point at which the process of starting the engine 1 is started and the cumulative amount of intake air for the engine 1 is "0", to the time point at which the cumulative amount becomes equal to or larger than the predetermined value "a". However, the length of the time period TL may be empirically set in advance. In this case, the time period TL may be a time period that has the set length, and that starts at the time point at which the process of starting the engine 1 is started.

The invention may be applied to an internal combustion engine in which the turbocharger 6 is not provided. In this case, the intake air temperature sensors may be provided at any two different positions in a longitudinal direction of the intake passage 3.

The invention claimed is:
1. A malfunction diagnostic apparatus for intake air temperature sensors provided in an intake passage of an internal combustion engine at any two different positions in a longitudinal direction of the intake passage, wherein each of the intake air temperature sensors detects an intake air temperature used for a control for the internal combustion engine, and the intake air temperature sensors include a first intake air temperature sensor and a second intake air temperature sensor, the malfunction diagnostic apparatus comprising:
a coolant temperature sensor that detects a coolant temperature that is a temperature of a coolant of the internal combustion engine;

a first determination portion that determines that a precondition for performing a malfunction diagnosis is satisfied, if both of a first condition and a second condition are satisfied when a process of starting the internal combustion engine is started, wherein the first condition is a condition that the coolant temperature detected by the coolant temperature sensor is determined to be equal to the intake air temperature detected by the second intake air temperature sensor provided at a portion of the intake passage, which is more likely to be cooled than a portion of the intake passage at which the first intake air temperature sensor is provided, and the second condition is a condition that the coolant temperature decreases by a decrease amount that is equal to or larger than a preset value that is set in advance, during a time period from a time point at which a process of stopping the internal combustion engine is completed, to a time point at which the process of starting the internal combustion engine is started;

a second determination portion that makes a tentative determination as to whether a malfunction occurs in at least one of the first and second intake air temperature sensors, if the first determination portion determines that the precondition is satisfied when the process of starting the internal combustion engine is started, wherein the second determination portion makes the tentative determination that the first and second intake air temperature sensors normally function, if a difference between the intake air temperatures detected by the first and second intake air temperature sensors is equal to or smaller than a reference value that is set in advance, and the second determination portion makes the tentative determination that a malfunction occurs in at least one of the first and second intake air temperature sensors, if the difference between the intake air temperatures detected by the first and second intake air temperature sensors is larger than the reference value; and a third determination portion that determines that the tentative determination is an invalid determination, if at least one of the intake air temperatures detected by the first and second intake air temperature sensors changes during a given time period that starts at the time point at which the process of starting the internal combustion engine is started, and determines that the tentative determination is a valid determination, if neither of the intake air temperatures detected by the first and second intake air temperature sensors changes during the given time period.

2. The malfunction diagnostic apparatus according to claim 1, wherein the third determination portion makes a determination as to whether at least one of the intake air temperatures detected by the first and second intake air temperature sensors changes during a time period from the time point at which the process of starting the internal combustion engine is started and a cumulative amount of intake air for the internal combustion engine is zero, to a time point at which the cumulative amount becomes equal to or larger than a predetermined value, and the third determination portion determines whether the tentative determination is an invalid determination or a valid determination, based on the determination as to whether at least one of the detected intake air temperatures changes during the time period; and the predetermined value is smaller than a required cumulative amount of the intake air during a period from the time point at which the process of starting the internal combustion engine is started, to a time point at which heat generated by the internal combustion engine is transmitted to air in the intake passage, and the predetermined value is larger than a total amount of the air that exists in the intake passage at the time point at which the process of starting the internal combustion engine is started.

3. The malfunction diagnostic apparatus according to claim 1, wherein the preset value used in the second condition is equivalent to the decrease amount by which the coolant temperature decreases during a time period longer than a time period from the time point at which the process of stopping the internal combustion engine is completed, to a time point at which each of the intake air temperatures becomes lower than a value near a highest value after an increase of each of the intake air temperatures to the highest value.

4. The malfunction diagnostic apparatus according to claim 3, wherein the preset value used in the second condition is equivalent to the decrease amount by which the coolant temperature decreases during a time period longer than a time period from the time point at which the process of stopping the internal combustion engine is completed, to a time point at which each of the intake air temperatures becomes lower than a value at the time point at which the process of stopping the internal combustion engine is completed, after an increase of each of the intake air temperatures to the highest value.

5. The malfunction diagnostic apparatus according to claim 1, wherein an exhaust gas recirculation control is executed for the internal combustion engine so that part of exhaust gas passing through an exhaust system is returned to an intake system through an exhaust gas recirculation mechanism;

the exhaust gas recirculation control is executed using the intake air temperature detected by the first intake air temperature sensor provided at the portion of the intake passage, which is less likely to be cooled than the portion of the intake passage at which the second intake air temperature sensor is provided; and the reference value is set so that if the intake air temperature detected by the first intake air temperature sensor deviates from an actual intake air temperature by the reference value, and the exhaust gas recirculation control is influenced by deviation of the detected intake air temperature, a level of deterioration of exhaust emissions discharged from the internal combustion engine is equal to an allowable limit level.

6. A malfunction diagnostic method for intake air temperature sensors provided in an intake passage of an internal combustion engine at any two different positions in a longitudinal direction of the intake passage, wherein each of the intake air temperature sensors detects an intake air temperature used for a control for the internal combustion engine, and the intake air temperature sensors include a first intake air temperature sensor and a second intake air temperature sensor, the malfunction diagnostic method comprising:

determining that a precondition for performing a malfunction diagnosis is satisfied, if both of a first condition and a second condition are satisfied when a process of starting the internal combustion engine is started, wherein the first condition is a condition that a coolant temperature, which is a temperature of a coolant of the internal combustion engine, and which is detected by a coolant temperature sensor, is determined to be equal to the intake air temperature detected by the second intake air temperature sensor provided at a portion of the intake passage, which is more likely to be cooled than a portion of the intake passage at which the first intake air temperature sensor is provided, and the second condition is a condition that the coolant temperature decreases by a decrease amount that is equal to or larger than a preset value that is set in advance, during a time period from a time point at which a process of stopping the internal combustion engine is completed, to a time point at which the process of starting the internal combustion engine is started;

making a tentative determination as to whether a malfunction occurs in at least one of the first and second intake air temperature sensors, if it is determined that the precondition is satisfied when the process of starting the internal combustion engine is started, wherein the tentative determination that the first and second intake air temperature sensors normally function is made, if a difference between the intake air temperatures detected by the first and second intake air temperature sensors is equal to or smaller than a reference value that is set in advance, and the tentative determination that a malfunction occurs in at least one of the first and second intake air temperature sensors is made, if the difference between the intake air temperatures detected by the first and second intake air temperature sensors is larger than the reference value; and determining that the tentative determination is an invalid determination, if at least one of the intake air temperatures detected by the first and second intake air temperature sensors changes during a given time period that starts at the time point at which the process of starting the internal combustion engine is started, and determining that the tentative determination is a valid determination, if neither of the intake air temperatures detected by the first and second intake air temperature sensors changes during the given time period.

7. The malfunction diagnostic method according to claim 6, wherein
it is determined whether at least one of the intake air temperatures detected by the first and second intake air temperature sensors changes during a time period from the time point at which the process of starting the internal combustion engine is started and a cumulative amount of intake air for the internal combustion engine is zero, to a time point at which the cumulative amount becomes equal to or larger than a predetermined value, and it is determined whether the tentative determination is an invalid determination or a valid determination, based on whether at least one of the detected intake air temperatures changes during the time period; and
the predetermined value is smaller than a required cumulative amount of the intake air during a period from the time point at which the process of starting the internal combustion engine is started, to a time point at which heat generated by the internal combustion engine is transmitted to air in the intake passage, and the predetermined value is larger than a total amount of the air that exists in the intake passage at the time point at which the process of starting the internal combustion engine is started.

8. The malfunction diagnostic method according to claim 6, wherein
the preset value used in the second condition is equivalent to the decrease amount by which the coolant temperature decreases during a time period longer than a time period from the time point at which the process of stopping the internal combustion engine is completed, to a time point at which each of the intake air temperatures becomes lower than a value near a highest value after an increase of each of the intake air temperatures to the highest value.

9. The malfunction diagnostic method according to claim 8, wherein
the preset value used in the second condition is equivalent to the decrease amount by which the coolant temperature decreases during a time period longer than a time period from the time point at which the process of stopping the internal combustion engine is completed, to a time point at which each of the intake air temperatures becomes lower than a value at the time point at which the process of stopping the internal combustion engine is completed, after an increase of each of the intake air temperatures to the highest value.

10. The malfunction diagnostic method according to claim 6, wherein:
an exhaust gas recirculation control is executed for the internal combustion engine so that part of exhaust gas passing through an exhaust system is returned to an intake system through an exhaust gas recirculation mechanism;
the exhaust gas recirculation control is executed using the intake air temperature detected by the first intake air temperature sensor provided at the portion of the intake passage, which is less likely to be cooled than the portion of the intake passage at which the second intake air temperature sensor is provided; and
the reference value is set so that if the intake air temperature detected by the first intake air temperature sensor deviates from an actual intake air temperature by the reference value, and the exhaust gas recirculation control is influenced by deviation of the detected intake air temperature, a level of deterioration of exhaust emissions discharged from the internal combustion engine is equal to an allowable limit level.

* * * * *